Oct. 16, 1923.

D. D. DORRANCE

COOKING UTENSIL

Filed May 1, 1923

1,470,963

Inventor
Donald D. Dorrance

By *Lacy & Lacy*, Attorneys

Patented Oct. 16, 1923.

1,470,963

UNITED STATES PATENT OFFICE.

DONALD D. DORRANCE, OF SCOTTS, MICHIGAN.

COOKING UTENSIL.

Application filed May 1, 1923. Serial No. 635,947.

*To all whom it may concern:*

Be it known that I, DONALD D. DORRANCE, a citizen of the United States, residing at Scotts, in the county of Kalamazoo and State of Michigan, have invented certain new and useful Improvements in Cooking Utensils, of which the following is a specification.

My invention relates to a cooking utensil, and the main object of the invention is to provide a vessel of the self-basting class, which needs no water and is constructed without double walls or liners of heat resisting material.

The principal use of the utensil is for roasting meats. Ordinarily the condensed steam and meat juice collect on the flat or arched cover of the utensil and run down the sides thereof into the bottom of the pan and very little of this juice drips down on the meat to be roasted. Consequently the cook or housewife would have to take off the cover repeatedly and baste the meat by hand. This is not only a tedious operation, but also permits a great deal of the flavor to evaporate with the steam while the basting is taking place.

Unless great care is taken during this operation, the cook is liable to burn the skin on her hands or face.

By using the cooking utensil forming the subject matter of the present invention, these disadvantages are obviated as there is no need for lifting the cover while the meat is being cooked, so that all the steam and flavor of the meat remain in the roaster while the steam condensing at the top of the cover is carried down over the top of the meat to do the basting automatically. Any part of the vapors condensing on the sides of the cover runs down into the pan and is not lost.

In the accompanying drawing, one embodiment of the invention is illustrated, and—

This utensil consists of three main parts, namely, the cover 10, the pan 11 and the base 12.

Figure 1:
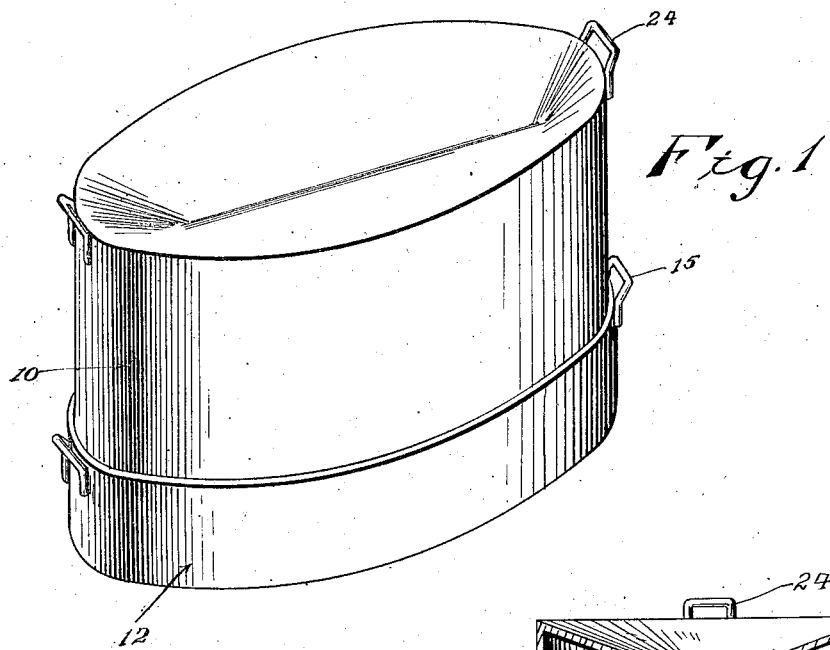
Figure 1 shows a perspective view of the cooking utensil.
Figure 2:
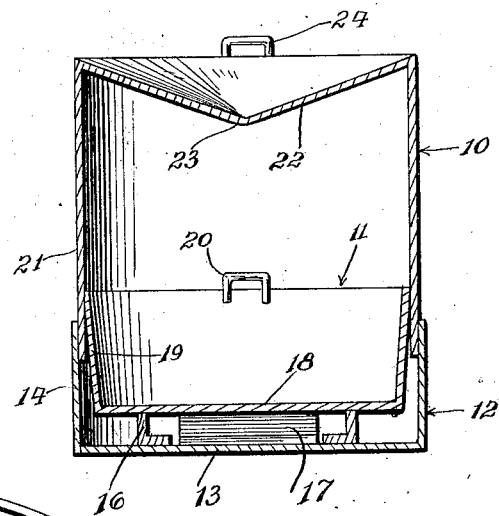
Figure 2 is a transverse section thereof assembled.
Figure 3:
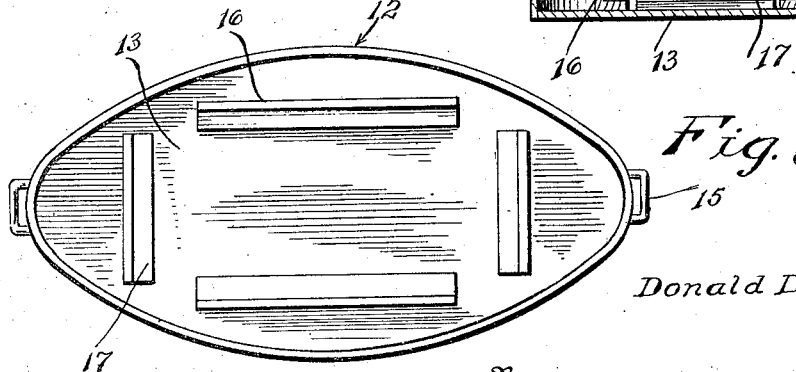
Figure 3 is a top plan view of the base.

The base 12, as indicated in Figure 3, is preferably of oval contour, but may of course have any other shape. It has a bottom 13 and upright side walls 14 running all around the edge of the bottom. A pair of handles 15 may be provided at the opposite ends of the base, and upon its bottom are deposited two longitudinal supports 16 and two transverse supports 17. These are firmly secured in the bottom as by welding or in any other suitable manner and preferably made out of angle bars, as indicated in Figure 2. These supports 16 and 17 are of uniform height so as to form a seat for the pan 11.

The pan has a flat bottom 18 and downwardly tapering side walls 19, as best seen in Figure 2. At the opposite ends of the pan are provided interior handles 20 which are so constructed that they will be housed within the cover 10 when the latter is in position.

The cover 10 is similar in shape to the base 12, but its side walls 21 are made to fit snugly within the side walls 14 of the base, or, in other words, the cover has telescopic engagement with the base 12 so that it may be raised or lowered therein when in position. The pan 11 fits with its wider upper edge snugly within the walls 21 of the cover, so that when the parts are assembled as indicated in Figure 2, the top edge of the pan 11 is raised above the top edge of the base 12, while the bottom edge of the cover 10 engages between these two edges and is pushed down below the top edge of the base 12. The cover 10 may thus be positioned as in this figure, or if the meat to be roasted permits, it may be pushed down until its bottom edge rests on the bottom of the base 12.

The top 22 of the cover is concave on the outside so as to form a sharp ridge 23 in the length direction of the cover. In other words, the top is made to slant inwardly from the upper edges of the wall 21 of the cover instead of as usual being outwardly convex. By this arrangement it will be evident that any vapor formed on the under side of the top 22 will slowly run down to the ridge 23, and when sufficient condensed vapor collects at the ridge it will drop down over the meat deposited in the pan 11 and baste it in this manner.

The dimensions across the top of the pan 11 are such that it will fit fairly tight in the cover 10 and any vapor condensing on the walls 21 of the cover will accordingly run down these walls and be taken up by the top edge of the pan to be deposited therein. In this manner none of the vapor nor the flavor of the meat, while being cooked, will be lost, but all remain within the utensil. At opposite ends of the cover 10 are provided exterior handles 24 for lifting the cover off the utensil.

Referring particularly to Figure 2, it will be seen that the top edge of the pan 11 extends some distance beyond the top edge of the base 12, in this manner the three main parts of the roaster are locked together during use and can not accidentally be overturned. The reason for tapering the pan 11 towards the bottom is to make it easy to lift the same out of the base 12.

The following dimensions have been found practical in constructing this cooking utensil, namely, the pan 11 and the base 12 each four inches high and the bottom rails or supports one inch high, and the cover about eleven inches high. Accordingly, the pan 11 will project above the top edge of the base 12 about one inch and enter the cover the same amount. The transverse and length dimensions of the utensil may be varied according to the size of the meat to be cooked.

As this utensil is practically air tight during operation, it is unnecessary to have water in the base 12 during the roasting of the meat as the vapors from the meat itself will prevent its burning or from its becoming dry.

Referring again to Figure 2, it will be seen that a comparatively large air chamber will be formed between the bottom of the base 12 and the bottom of the pan 11. By this means, no burning of the meat to be roasted can take place as it will be impossible to overheat the pan although no double walls or asbestos filling has been resorted to. With the parts assembled, as seen in Figure 2, a double walled vessel is practically obtained by the spacing of the pan from the base.

The roaster is preferably manufactured from sheet metal or tin plate.

With the handles deposited, as indicated, it is very easy to lift the entire roaster by using the exterior handles 15 on the base 12. It is also very convenient to remove the cover 10 by the use of the exterior handles 24 thereon and finally the pan 11 is easily lifted out from the base 12 by means of the interior handles 20 furnished at the top edge thereof.

Having thus described the invention, what is claimed as new is:

1. A cooking utensil comprising a base, a cover, and a pan; the corresponding side walls of said base and cover being parallel and of similar contour and adapted to have telescopic engagement for adjusting the height of the utensil, said pan fitting snugly within said cover.

2. A cooking utensil comprising a base, a cover, and a pan; the corresponding side walls of said base and cover being parallel and of similar contour and adapted to have telescopic engagement for adjusting the height of the utensil, said pan having inclined sides, its top edge fitting snugly within said cover, and means for raising the pan above the bottom of said base.

3. A cooking utensil comprising a base, a cover, and a pan; the corresponding side walls of said base and cover being parallel and of similar contour and adapted to have telescopic engagement for adjusting the height of the utensil, said pan having inclined sides, its top edge fitting snugly within said cover, and means for raising the pan above the bottom of said base, said means including transverse and longitudinal angle bars in the bottom of the base.

4. A cooking utensil comprising a base, a cover, and a pan; the corresponding side walls of said base and cover being parallel and of similar contour and adapted to have telescopic engagement for adjusting the height of the utensil, said pan having inclined sides, its top edge fitting snugly within said cover, transverse and longitudinal angle bars in the bottom of the base adapted to support said pan, and an inwardly convexed top on said cover forming a sharp ridge on the under side thereof.

5. A cooking utensil comprising a base, a cover, and a pan; the corresponding side walls of said base and cover being parallel and of similar contour and adapted to have telescopic engagement for adjusting the height of the utensil, said pan having inclined sides, its top edge fitting snugly within said cover, said cover having an inwardly convexed top forming a sharp long ridge on the under side thereof, and means for raising the pan above the bottom of said base.

In testimony whereof I affix my signature.

DONALD D. DORRANCE. [L. S.]